R. PERRY.
RIDING ATTACHMENT FOR DRAGS.
APPLICATION FILED MAR. 3, 1916.
1,232,965.
Patented July 10, 1917.
2 SHEETS—SHEET 1.
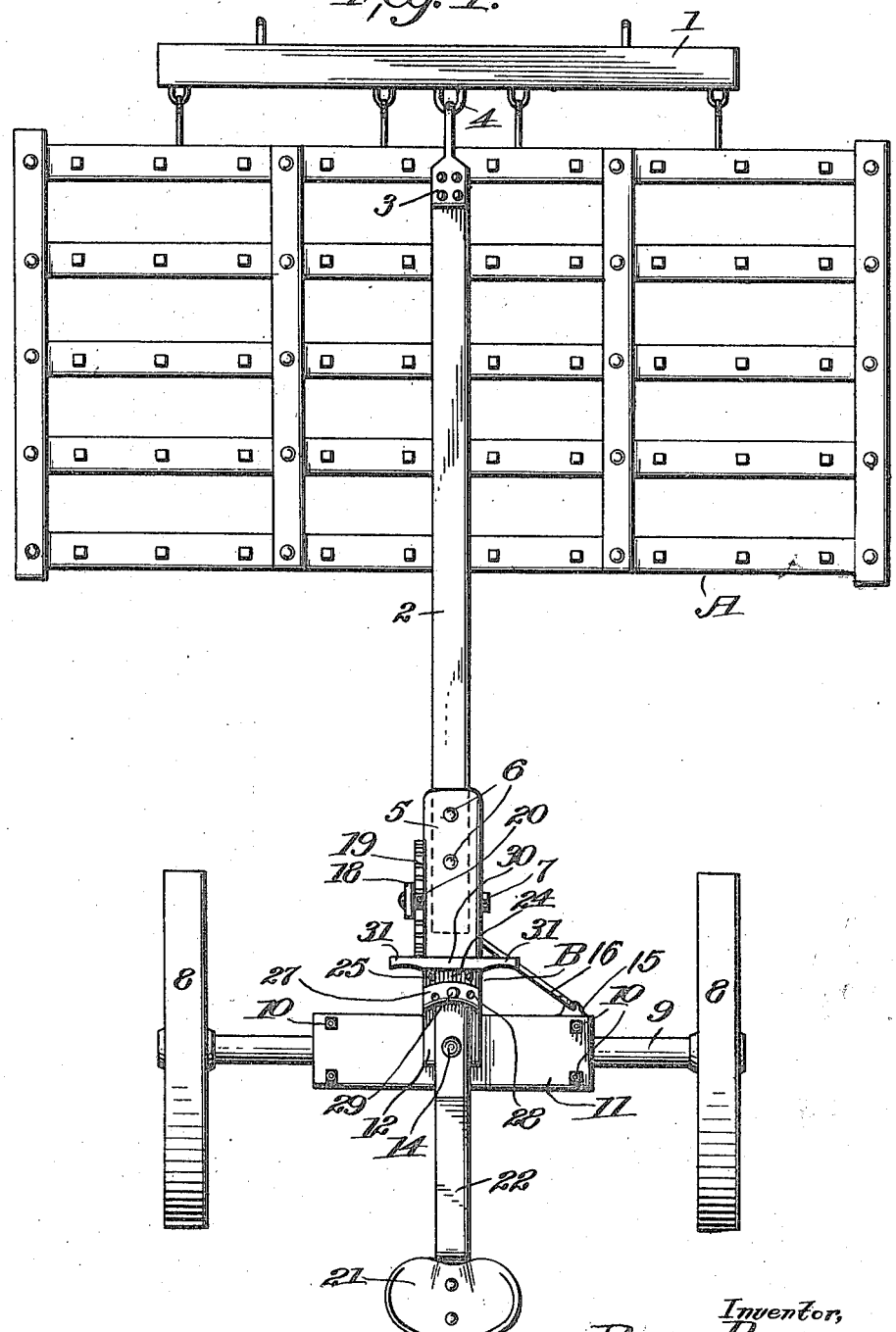
Inventor,
Roy Perry,
by Frank R Fuller
his Attorney.

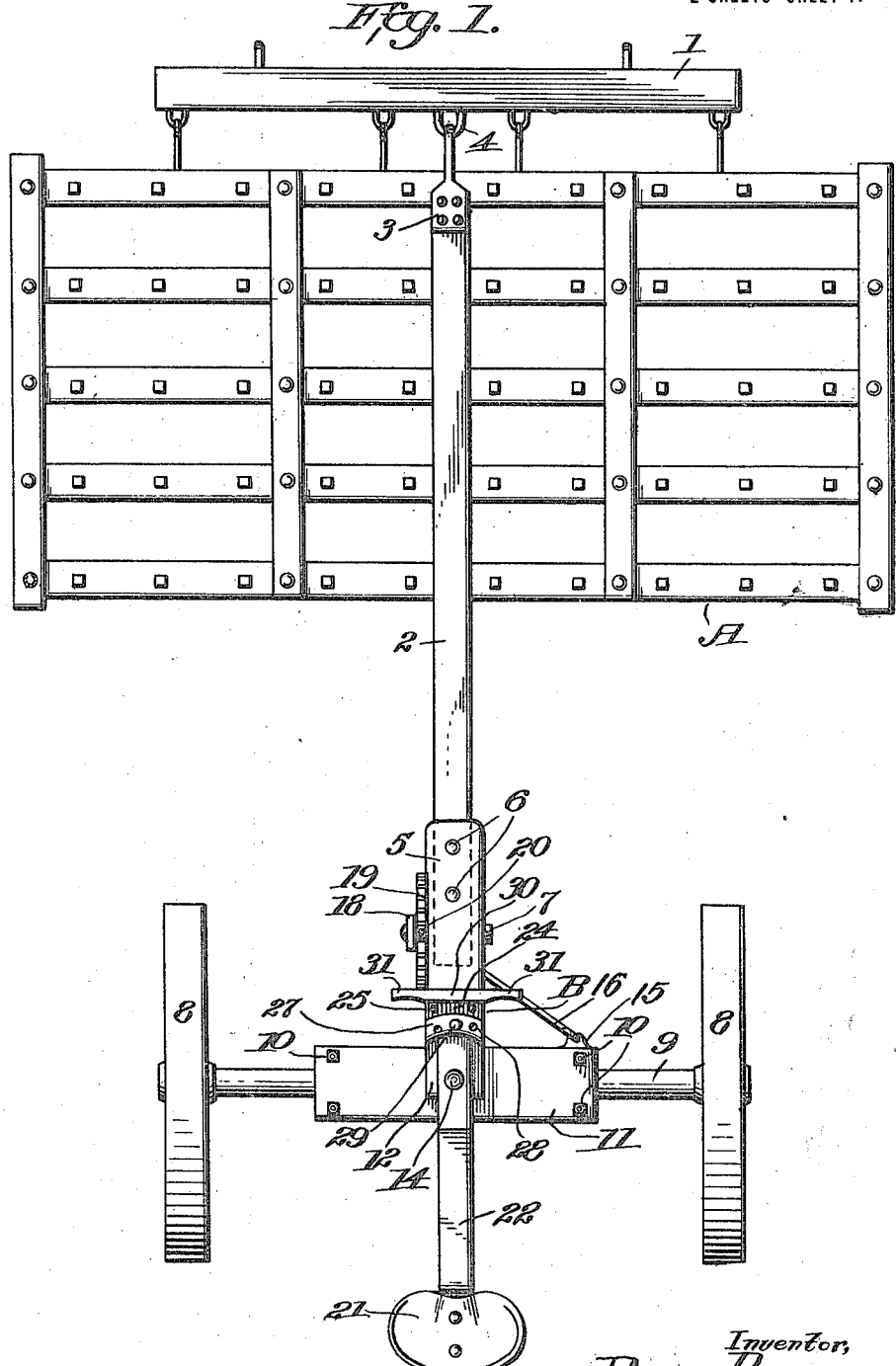

UNITED STATES PATENT OFFICE.

ROY PERRY, OF GREENE, IOWA.

RIDING ATTACHMENT FOR DRAGS.

1,232,965.    Specification of Letters Patent.    Patented July 10, 1917.

Application filed March 3, 1916. Serial No. 81,876.

*To all whom it may concern:*

Be it known that ROY PERRY, a citizen of the United States, residing at Greene, in the county of Butler and State of Iowa, has invented certain new and useful Improvements in Riding Attachments for Drags, of which the following is a specification.

My invention relates to riding attachment for a drag harrow or other implement which will stir dust in operation, and the main object is to provide a means for attachment for the purpose specified which is adjustable so that the driver may ride with the drag and attachment but without the zone of dust created by its travel; to provide a novel means whereby the driver's seat may be moved to and fastened in different adjusted positions; to provide a novel means or specific construction of a casting or member adapted to serve as a foot rest and as a medium for securing the seat in adjusted positions; and to generally improve and simplify the construction of apparatus of this nature.

With the above and additional objects, such as will hereinafter appear, in view, the invention has been embodied in one preferred form as hereinafter described and illustrated in accompanying drawings.

In said drawings:—

Figure 1 is a plan view showing my attachment in connection with a drag harrow; Fig. 2 is a longitudinal sectional view through my improved attachment taken at one side of the longitudinal center and including a tree of the drag harrow; Fig. 3 is a detail view showing the connection between the shifting lever and the axle bed, and Fig. 4 is a detail perspective view illustrating the means for fastening the seat in adjusted positions.

Referring specifically to the drawings, wherein like reference characters designate like or similar parts throughout the views thereof, A represents a diagrammatic form of drag harrow of which 1 is a draft tree. It is to be understood that the implement A is diagrammatic as stated, or conventional, since it represents any implement which will stir dust which is obnoxious to the driver, during travel.

A draft beam 2 is employed as part of the attachment and at its front end has a clevis 3 by means of which it is connected to the tree 1 by passage through a staple 4. Beam 2 extends into a hollow trunk or metallic beam 5 and may be fastened therein by detachable bolts 6 and a detachable bolt 7. The attachment also employs wheels 8 suitably mounted on an axle 9 clamped by bolts 10 between sections 11 collectively forming an axle bed. Trunk 5, at one end, is bifurcated so as to have arms 12 and 13, to respectively engage the upper surface and lower surface of the axle bed. Arms 12 and 13 are secured in place by means of a bolt 14 which passes therethrough and through the axle bed and axle. It is advisable, at times, to dispose the axle and its bed at different angles to the trunk 5 and therefore, a lug 15 has been formed integral with one section of the axle bed, so as to pivotally engage a link 16, in turn pivotally engaged by a link or ring 17 which is pivoted to an operating lever 18. Said lever 18 utilizes the bolt 7 as its fulcrum and swings across a toothed segment 19 fastened to or integral with the trunk 5. The notches of segment 19 are adapted to be engaged by a manually operable lock plunger 20 of lever 18 in order to fasten the lever in adjusted positions.

An operator's seat is shown at 21, being mounted by a supporting bar 22 utilizing the bolt 14 as a fulcrum for horizontal movement. The foremost end of bar 22 is provided with an aperture 23. A suitable means is provided to coöperate with the aperture 23 to fasten the bar 22 in adjusted positions. To this end a fastening member as shown at B may be utilized. This member has an attaching plate 24 through which bolts or the like 25 may pass to secure the member B to trunk 5. Integral with the plate 24 is an arcuate upstanding wall 26 which is bent rearwardly at right angles at 27, thus providing a flange which overlaps the forward end of lever or bar 22 and thus serves to prevent upward movement of the bar at the front end. In the plate 27 any suitable number of apertures 28 are provided adapted to selectively register with the aperture 23 so that a lock pin 29 may be passed through one of the apertures 28 and the aperture 23 to fasten the bar 22 against pivotal movement.

A wall 30 integral with wall 24 also extends upwardly therefrom at its front and at its top is slightly bent forward and is enlarged laterally to provide foot rests 31.

In operation, the wheeled attachment may travel centrally and in the rear of the drag A as usual. However, if dust be stirred, plunger 20 and lever 18 may be operated so as to turn the axle 9 and wheels 8 in order that the attachment may travel to a desired position laterally of the drag and out of the line of dust. When this position is reached, the lever and plunger may be again shifted to place the wheels at the proper angle and then released. Through this means of adjustment, the operator's seat may be moved to a position which is desirable and will be without the zone of dust stirred by the machine in travel. In the said adjusted positions of the wheeled structure, it will be advisable, in some instances, to adjust the position of the seat 21. To accomplish this end, pin 29 is removed and bar 22 is turned until it is in the desired position whereupon the pin 29 is inserted through the alining apertures 23 and 28.

Since merely the preferred embodiment has been illustrated and described, it is to be understood that changes in the details of construction may be resorted to within the spirit and scope of the appended claims.

I claim:

1. A riding attachment including a trunk having arms, an axle, wheels mounted on said axle, an axle bed, a pivot member passing through said arms, axle and axle bed, a seat structure turnably mounted by said pivot, and means on the trunk to fasten the seat structure in adjusted positions.

2. In combination with an implement, a riding attachment movable laterally thereof including a seat structure, and means to adjust and fasten said seat to and in different positions laterally of the attachment.

3. In combination with an implement, a riding attachment movable laterally thereof including a seat member, means to mount said member for movement independently of the attachment, a fastening member on the attachment relative to which said seat member moves, one of said members having an aperture and the other of said members having a plurality of apertures to register with said aperture, and means to enter said apertures and fasten said seat member in different adjusted positions.

4. In combination with an implement, a riding attachment movable laterally thereof, a seat member pivoted on said attachment for movement laterally thereof, a flange member overlapping said member, one of said members having an aperture therein and the other of said members having a plurality of apertures therein, means to enter said apertures to fasten the seat member in different adjusted positions, an attaching plate integral with said flange member, and foot rest means integral with the attaching plate and disposed above said flange.

5. In combination with an implement, a riding attachment movable laterally thereof, a hollow trunk, a beam connected to the implement extending into said trunk, a lever, a fastening element connecting said lever, trunk and beam, arms on said trunk, an axle, wheels on said axle, an axle bed disposed intermediate said arms, a seat member, a bolt extending through said seat member, arms, axle and axle bed to pivotally mount the seat and axle, flexible means connecting said axle bed to said lever, a fastening member having an attaching plate secured to the trunk, a flange integral with said attaching plate overlapping the seat member and means coöperating with the said flange and seat member to fasten the seat member in different adjusted positions.

In testimony whereof I affix my signature.

ROY PERRY.

Copies of this patent may be obtained for five cents each, by addressing the "Commissioner of Patents. Washington, D. C."